(12) United States Patent
Suzuki et al.

(10) Patent No.: US 11,773,239 B2
(45) Date of Patent: Oct. 3, 2023

(54) CELLULOSE ACETATE AND MOLDED ARTICLE

(71) Applicant: DAICEL CORPORATION, Osaka (JP)

(72) Inventors: Ikuhiro Suzuki, Himeji (JP); Yuya Ashida, Himeji (JP); Akihiro Higuchi, Himeji (JP)

(73) Assignee: DAICEL CORPORATION, Osaka (JP)

( * ) Notice: Subject to any disclaimer, the term of this patent is extended or adjusted under 35 U.S.C. 154(b) by 734 days.

(21) Appl. No.: 16/480,618

(22) PCT Filed: Jan. 17, 2018

(86) PCT No.: PCT/JP2018/001228
§ 371 (c)(1),
(2) Date: Jul. 24, 2019

(87) PCT Pub. No.: WO2018/139317
PCT Pub. Date: Aug. 2, 2018

(65) Prior Publication Data
US 2021/0277206 A1    Sep. 9, 2021

(30) Foreign Application Priority Data
Jan. 25, 2017   (JP) .................. 2017-011241

(51) Int. Cl.
*C08L 1/12*    (2006.01)
*C08B 3/06*    (2006.01)

(52) U.S. Cl.
CPC . *C08L 1/12* (2013.01); *C08B 3/06* (2013.01)

(58) Field of Classification Search
CPC .................................... C08B 3/06; C08L 1/12
See application file for complete search history.

(56) References Cited

U.S. PATENT DOCUMENTS

| | | | |
|---|---|---|---|
| 4,415,734 A | 11/1983 | Yabune et al. | |
| 5,977,346 A | 11/1999 | Saka et al. | |
| 2012/0172585 A1 | 7/2012 | Shimamoto et al. | |
| 2018/0037670 A1 | 2/2018 | Higuchi et al. | |

FOREIGN PATENT DOCUMENTS

| | | | |
|---|---|---|---|
| EP | 0 763 544 A1 | | 3/1997 |
| GB | 000287540 A | * | 11/1928 |
| JP | 56-59801 A | | 5/1981 |
| JP | 60-17441 B2 | | 5/1985 |
| JP | 61-247701 A | | 11/1986 |
| JP | 6-157601 A | | 6/1994 |
| JP | 6-157602 A | | 6/1994 |
| JP | 2001-59001 A | | 3/2001 |
| JP | 2005040999 A | * | 2/2005 |
| JP | 2005-82706 A | | 3/2005 |
| JP | 2005181683 A | * | 7/2005 |
| JP | 2007-261189 A | | 10/2007 |
| JP | 2013-142786 A | | 7/2013 |
| JP | 2016-56253 A | | 4/2016 |
| WO | WO 2011/093216 A1 | | 8/2011 |
| WO | WO 2016/135778 A | | 9/2016 |

OTHER PUBLICATIONS

English translations of Written Opinion of the International Searching Authority and International Search Report, dated Mar. 20, 2018, for International Application No. PCT/JP2018/001228.
Steinmeier, "3. Acetate Manufacturing, Process and Technology, 3.1 Chemistry of Cellulose Acetylation," Macromol. Symp., vol. 208, 2004, pp. 49-60 (7 total pages).
Wells et al., "Hemicellulose and False Viscosity in Cellulose Acetate," Tappi, vol. 46, No. 10, Oct. 1963, pp. 581-586 (4 total pages).
Wilson et al., "Influences of Hemicelluloses on Acetate Processing in High Catalyst Systems," Tappi, vol. 57, No. 8, Aug. 1974, pp. 76-80 (3 total pages).
Extended European Search Report dated Oct. 20, 2020 for Application No. 18744631.5.

* cited by examiner

*Primary Examiner* — Leigh C Maier
*Assistant Examiner* — Everett White
(74) *Attorney, Agent, or Firm* — Birch, Stewart, Kolasch & Birch, LLP (57) ABSTRACT

The purpose of the present invention is to provide a cellulose acetate excellent in transparency, and a molded article of the cellulose acetate.
In the cellulose acetate, an acetylation degree is 52% or more and 59% or less, and a content of low-molecular-weight components having a molecular weight of not more than ¼ of a peak top molecular weight in a molecular weight distribution measured by gel permeation chromatography of cellulose acetate is 12% or less.

5 Claims, 2 Drawing Sheets

CELLULOSE ACETATE AND MOLDED ARTICLE

TECHNICAL FIELD

The present invention relates to cellulose acetate and a molded article.

BACKGROUND ART

Cellulose acetate is one of organic acid esters of cellulose, which are cellulose derivatives, and cellulose acetate is used in a wide range of applications such as clothing fibers, tobacco filter chips, plastics, films, coating materials, pharmaceuticals, foods, cosmetics and construction. Among cellulose derivatives, cellulose acetate is produced in large quantities, and is industrially important.

Typical methods for producing cellulose acetate on an industrial scale includes a so-called acetic acid method in which acetic anhydride is used as an acetylating agent, acetic acid is used as a diluent, and sulfuric acid is used as a catalyst. The acetic acid method includes, as essential steps, (1) a pretreatment step of disintegrating and cracking a pulp raw material (dissolved pulp) with a relatively high α-cellulose content, then spraying acetic acid and mixing the mixture; (2) an acetylating step of reacting the pretreated pulp in the step (1) with a mixed acid including acetic anhydride, acetic acid and an acetylating catalyst (e.g. sulfuric acid); (3) an aging step of hydrolyzing cellulose acetate to obtain cellulose acetate having a desired acetylation degree; and (4) a posttreatment step of precipitating the cellulose acetate after completion of the hydrolysis reaction, separating the cellulose acetate from the reaction solution, and purifying, stabilizing and drying the cellulose acetate (PTL 1 and NPL 1).

In general, fibers, films and plastics obtained by performing molding using, as a cellulose raw material acetate produced by the above-mentioned method have a slightly yellowish hue, and thus have a problem in appearance although other required properties are satisfied, and in this respect, their commercial value is reduced.

Therefore, for reducing the yellowness of cellulose acetate, secondary measures are generally taken such as addition of a white pigment, a fluorescent brightening agent, a bleaching agent and an antioxidant during molding. For example, in tobacco filters, it is common practice to add a pigment such as titanium dioxide. It is needless to say that such measures are not essential solutions, and effects thereof are limited.

On the other hand, attempts have been made to directly obtain cellulose acetate excellent hue by reducing yellowness. For example, it is pointed out that a hemicellulose component in wood pulp is a main factor of yellowness (NPLs 2 and 3), and it is suggested that cellulose acetate excellent in transparency can be obtained by adding an organic solvent during production of cellulose acetate (PTL 2), or temporarily dissolving cellulose diacetate in a solvent with a high dissolving property, and than recovering the cellulose diacetate (PTL 3). However, these techniques are effective only when low-quality pulp having a low α-cellulose content is used, and they cannot be used when pulp having a high α-cellulose content is used.

CITATION LIST

Patent Literature

PTL 1: Japanese Patent Application Laid-Open Publication No. 56-059801

PTL 2: Japanese Patent Laid-Open Publication No. 06-157601

PTL 3: Japanese Patent Laid-Open Publication No. 06-157602

Non Patent Literature

NPL 1: Macromol. Symp. 2004, 208, 49-60
NPL 2: J. D. Wilson, R S. Tabke, Tappi, 57, 77 (1974)
NPL 3: F. L. Wells, W C. Shattner, A Walker, Tappi, 46, 581(1963)

SUMMARY OF INVENTION

Technical Problem

In recent years, since giving a light color to cellulose acetate molded articles has come to be favored, and a fashion property taking advantage of higher transparency has come to be pursued, it has been desired that yellowness be solved at a higher level to provide cellulose acetate which has a more excellent hue and which is excellent in transparency. However, with conventional techniques, it is not possible to obtain cellulose acetate having such high transparency. A main object of the present invention is to provide a cellulose acetate excellent in transparency, and a molded article of the cellulose acetate.

Solution to Problem

For solving the above-mentioned problem, the present inventors have extensively conducted studies in order to develop cellulose acetate excellent in transparency. As a result, the present inventors have found that unexpectedly, when the content of low-molecular-weight components having a molecular weight of not more than ¼ of the peak top molecular weight in a molecular weight distribution measured by gel permeation chromatography of cellulose acetate is 12% or less, it is possible to obtain cellulose acetate having excellent transparency that cannot be achieved only by use of high-quality wood pulp, leading to completion of the present invention. That is, the present invention is as follows.

A first aspect of the present invention relates to cellulose acetate in which an acetylation degree is 52% or more and 59% or less, and a content of low-molecular-weight components having a molecular weight of not more than ¼ of a peak top molecular weight in a molecular weight distribution measured by gel permeation chromatography of cellulose acetate is 12% or less.

The cellulose acetate may have a viscosity at 6% of 30 mPa·s or more and 200 mPa·s or less.

The cellulose acetate may have a weight average molecular weight of 50,000 or more and 500,000 or less.

In the cellulose acetate, a ratio of a molar content of glucose to a sum of the molar contents of glucose, xylose and mannose may be 97% or more in sugar composition analysis.

A second aspect of the present invention relates to a molded article containing the cellulose acetate.

Advantageous Effects of Invention

According to the present invention, it is possible to provide cellulose acetate having excellent transparency and a molded article thereof.

DESCRIPTION OF EMBODIMENTS

Hereinafter, an example of a preferred embodiment will be described in detail. In cellulose acetate of the present disclosure, the acetylation degree is 52% or more and 59% or less, and the content of low-molecular-weight components having a molecular weight of not more than ¼ of the peak top molecular weight in a molecular weight distribution measured by gel permeation chromatography of cellulose acetate is 12% or less.

[Acetylation Degree]

The acetylation degree of the cellulose acetate of the present disclosure is 52% or more and 59% or less, and the lower limit of the acetylation degree is preferably 53% or more, more preferably 53.7% or more, still more preferably 54% or more. When the acetylation degree is less than 52%, the dimensional stability, moisture resistance, heat resistance or the like of the resulting molded article is reduced. On the other hand, the upper limit of the acetylation degree is preferably 57% or less, more preferably 56% or less, still more preferably 55.5% or less. When the acetylation degree is more than 59%, the resulting molded article is excellent in strength, but becomes brittle, and for example, when the molded article is used as a molded product such as a fiber material for clothing or the like, or a frame of glasses, sunglasses or the like, it is necessary to add a plasticizer in a large amount for obtaining softness such as an elongation suitable for such an application, leading to an increase in possibility of causing bleed-out.

Here, the acetylation degree means the amount of bonded acetic acid per cellulose unit weight of cellulose. The acetylation degree follows the measurement and calculation of an acetylation degree in ASTM: D-817-91 (Method for Testing Cellulose Acetate and Others).

The acetylation degree determined in accordance with the measurement method described above can be converted into an acetyl substitution degree using the following equations. This is the most common method for determining the substitution degree of cellulose acetate. According to the following equation, for example, an acetylation degree of 52% corresponds to an acetyl substitution degree of 2.21, and an acetylation degree of 59% corresponds to an acetyl substitution degree of 2.71.

$$DS = 162.14 \times AV \times 0.01 / (60.052 - 42.037 \times AV \times 0.01)$$

DS: acetyl substitution degree
AV: acetylation degree (%)

[Gel Permeation Chromatography]

In cellulose acetate of the present disclosure, the content of low-molecular-weight components having a molecular weight of not more than ¼ of the peak top molecular weight in a molecular weight distribution measured by gel permeation chromatography of cellulose acetate is 12% or less, and the upper limit of the content is preferably 11.0% or less, more preferably 10.0% or less, still more preferably 9.0% or less. When the content of low-molecular-weight components having a molecular weight of not more than ¼ of the peak top molecular weight is more than 12%, the yellowness of cellulose acetate tends to be intensified. On the other hand, the lower limit of the content of low-molecular-weight components having a molecular weight of not more than ¼ of the peak top molecular weight is preferably 1.0% or more, more preferably 4.0% or more, still more preferably 6.0% or more. When the content of low-molecular-weight components having a molecular weight of not more than ¼ of the peak top molecular weight is less than 1.0%, it is difficult to produce cellulose acetate stably. Further, when the content is less than 4.0%, the yield is reduced while transparency obtained by improving the hue is not significantly different from the transparency of cellulose acetate having a low-molecular-weight component content of 6.0% or more.

Here, the low-molecular-weight component is a component having a molecular weight of not more than ¼ of the peak top molecular weight in a molecular weight distribution measured by gel permeation chromatography. The peak top molecular weight is a molecular weight having a maximum intensity as measured by a differential refractometer. Examples of the low-molecular-weight component include components having a low polymerization degree, such as dimers, trimers and oligomers of the constituent sugars of the cellulose acetate.

Further, the content of low-molecular-weight components having a molecular weight of not more than ¼ of the peak top molecular weight in a molecular weight distribution measured by gel permeation chromatography is a ratio of a peak area with a molecular weight of not more than ¼ of the peak top molecular weight to a peak area of the whole region in the molecular weight distribution measured by gel permeation chromatography.

The molecular weight distribution (gel permeation chromatogram) measured by gel permeation chromatography has a molecular weight on the abscissa and a RI (intensity measured by differential refractometer) on the ordinate.

Figure 1:
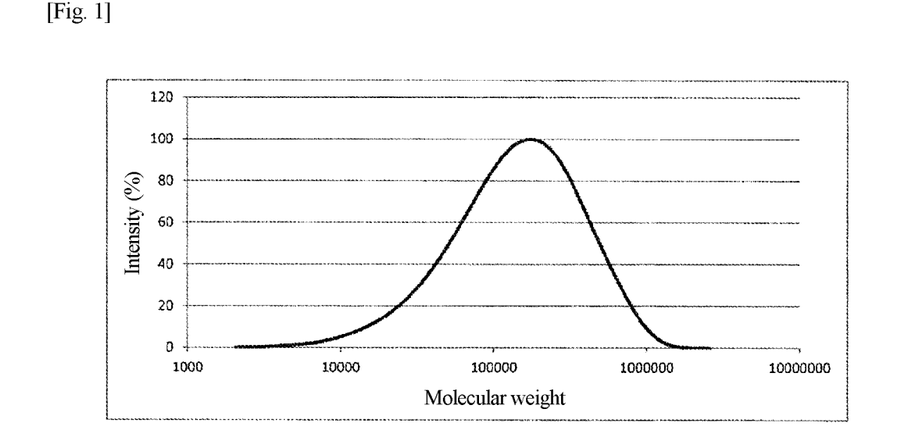
FIG. 1 is a graph showing one example of a molecular weight distribution of cellulose acetate.

A method for measuring a molecular weight and a molecular weight distribution by gel permeation chromatography is as follows. That is, a solution obtained by dissolving cellulose acetate in a solution with LiBr (lithium bromide) added in N-methyl-2-pyrrolidone at a concentration of 0.1 mol/L (hereinafter, referred to as "solution A") is measured at a temperature of 55° C. by a RI (differential refractometer) using a column-connected gel palmation chromatography (main body: HPLC Prominence manufactured by Shimadzu Corporation+analysis program Lab Solutions Ver. 5.73). The columns include a guard column (PolyPore GUARD size manufactured by Agilent Technologies, Inc., size: 50×7.5 mm) and main column (front-stage column: PolyPore manufactured by Agilent Technologies, Inc., size: 300×7.5 mm, rear-stage column: PolyPore manufactured by Agilent Technologies, Inc., size: 300×7.5 mm). Further, as use (measurement) conditions, solution A is used for a mobile phase, and the column temperature is set to 55° C. For calculation of the molecular weight and molecular weight distribution of the polymer, a relationship between the known molecular weight of polymethyl methacrylate (MM-10 set) manufactured by Agilent Technologies Inc. and the GPC measurement value (Retention Time) of the cellulose acetate is used. One example of the thus-obtained molecular weight distribution (gel permeation chromatogram) measured by gel permeation chromatography is shown in FIG. 1. In FIG. 1, the abscissa represents a molecular weight, and the ordinates represents a RI (intensity measured by a differential refractometer).

[Viscosity at 6%]

The viscosity at 6% of the cellulose acetate of the present disclosure is preferably 30 mPa·s or more and 200 mPa·s or less. The lower limit of the viscosity at 6% is more preferably 40 mPa·s or more, still more preferably 50 mPa·s or more, most preferably 60 mPa·s or more. When the viscosity at 6% is less than 30 mPa·s, the possibility increases that flowability in injection molding for obtaining a molded article is excessively high, leading to occurrence of leakage from a mold increases. On the other hand, the upper limit of the viscosity at 6% is more preferably 180 mPa·s or less, still more preferably 160 mPa·s or less, most preferably 140 mPa·s or less. When the viscosity at 6% is more than 200 mPa·s, flowability in injection molding for obtaining a molded article may be low, leading to deterioration of surface flatness of the molded article.

The viscosity at 6% can be adjusted by appropriately controlling the reaction time, the catalyst amount, the reaction temperature and the reaction concentration in the later-described acetylation step and saponification step in production of cellulose acetate.

Here, the viscosity at 6% is determined by dissolving cellulose acetate in a 95% acetone aqueous solution at a concentration of 6 wt/vol %, and measuring the fluidization time using an Ostwald viscometer

[Weight Average Molecular Weight]

The weight average molecular weight of the cellulose acetate of the present disclosure is preferably 50,000 or more and 500,000 or less. Further, the lower limit of the weight average molecular weight is more preferably 100,000 or more, still more preferably 140,000 or more, most preferably 180,000 or more. When the weight average molecular weight is less than 50,000, the possibility increases that flowability in injection molding is excessively high, leading to occurrence of leakage from a mold increases. On the other hand, the upper limit of the weight average molecular weight is more preferably 400,000 or less, still more preferably 300,000 or less, most preferably 250,000 or less. When the weight average molecular weight is more than 500,000, flowability in injection molding for obtaining a molded article may be low, leading to deterioration of surface flatness of the molded article.

Here, the weight average molecular weight (Mw) is a value obtained by multiplying the molecular weights of individual molecules by the molecular weights thereof, respectively, and determining a weighted average thereof. The weight average molecular weight is measured by GPC. The number average molecular weight (Mn) is a simple average per molecule, and is measured by GPC.

Even when the value of Mw/Mn is relatively large, that is, there are relatively large variations in molecular weight, cellulose acetate having a low YI value and absorptiometric hue and excellent transparency can be obtained when the content of low-molecular-weight components having a molecular weight of not more than ¼ of the peak top molecular weight is 12% or less.

[Ratio of Constituent Sugars]

In the cellulose acetate of the present disclosure, the ratio of the molar content of glucose to the sum of the molar contents of glucose, xylose and mannose is preferably 97% or more, more preferably 97.5% or more, still more preferably 98.0% or more, most preferably 98.5% or more in sugar composition analysis. It is not preferable that the ratio of the molar content of glucose to the sum of the molar contents of glucose, xylose and mannose is less than 97% because cellulose acetate tends to be yellowish.

The ratio of the molar content of glucose to the sum of the molar contents of glucose, xylose and mannose in sugar composition analysis can be determined by the following method.

Cellulose acetate is hydrolyzed with sulfuric acid, neutralized with barium carbonate, and filtered through a filter paper and an ion exchange filter, the molar contents of glucose, xylose and glucose are calculated from data obtained by HPLC-CAD among high performance liquid chromatography (HPLC) methods, and the ratio of the molar content of glucose to the sum of the molar contents of glucose, xylose and mannose is determined.

[Production of Cellulose Acetate]

A method for producing the cellulose acetate will be described in detail. A preferred method for producing cellulose acetate according to the present disclosure includes the following series of steps: activation step (i) of pretreating and activating cellulose raw material by adding acetic acid or acetic acid containing 1 to 10% by weight of sulfuric acid (sulfur-containing acetic acid) to the cellulose raw material in one step or two steps; acetylation step (ii) of acetylating the pretreated and activated cellulose in the presence of a sulfuric acid catalyst; saponification and aging step (iii) of partially neutralizing the sulfuric acid catalyst and performing aging in the presence of the sulfuric acid catalyst (or remaining sulfuric acid); purification and drying treatment (iv); grinding step (v); and step (vi) of reducing the amount of low-molecular-weight components contained in cellulose acetate. In the production method, in particular, purification and drying treatment (iv) is an optional step, and whether the step is carried out or not can be determined as appropriate. For a general method for producing a cellulose acetate, reference can be made to "Wood Chemistry" (Vol. 1) (Migita et al., Kyoritsu Publishing Co., Ltd., published in 1968, p.p. 180-190).

(Cellulose Raw Material)

As cellulose (pulp) to be used as a raw material of the cellulose acetate of the present disclosure, wood pulp (softwood pulp or hardwood pulp), cotton linter or the like can be used. These celluloses may be used singly or in combination of two or more thereof, and for example, softwood pulp and cotton linter or hardwood pulp may be used in combination.

Linter pulp will be described. Linter pulp is preferable because it has a high cellulose purity and a small amount of coloring components, and a molded product has high transparency.

Wood pulp will now be described. Wood pulp is preferable because it can be stably supplied as a raw material, and is more advantageous in terms of cost as compared to a linter. Examples of the wood pulp include hardwood pre-hydrolyzed kraft pulp. Further, as wood pulp, crushed pulp obtained by crushing hardwood pre-hydrolyzed kraft pulp or the like into a cotton shape can be used. Crushing can be performed using, for example, a disc refiner.

Further, the α cellulose content of the cellulose raw material is preferably 90% by weight or more, more preferably 92% by weight or more, still more preferably 95% by weight or more, most preferably 97% by weight or more for reducing the amount of insoluble residues to prevent impairment of transparency of a molded product.

When cellulose raw material is difficult to handle because it is supplied in the form of a sheet, etc., it is preferable to pass through a step of subjecting the cellulose raw material to grinding treatment in a dry process.

(Activation Step (i))

In activation step (i) of pretreating and activating the cellulose raw material by adding acetic acid or acetic acid containing 1 to 10% by weight of sulfuric acid (sulfur-containing acetic acid) to the cellulose raw material, the acetic acid and/or sulfur-containing acetic acid can be added in an amount of preferably 10 to 500 parts by weight based on 100 parts by weight of the cellulose raw material. The method for adding acetic acid and/or sulfur-containing acetic acid to cellulose may be, for example, a method in which acetic acid or sulfur-containing acetic acid is added in once, or a method in which acetic acid or sulfur-containing acetic acid is added in twice or more. Examples of the method in which acetic acid or sulfur-containing acetic acid is added in twice or more include a method in which sulfur-containing acetic acid is added after elapse of a certain amount of time after addition of acetic acid, and a method in which acetic acid is added after elapse of a certain amount of time after addition of sulfur-containing acetic acid. The specific addition means may be, for example, a method in which acetic acid or sulfur-containing acetic acid is sprayed, and the mixture is stirred.

Pretreatment and activation can be carried out by, for example, adding acetic acid and/or sulfur-containing acetic acid to cellulose, and then leaving the mixture standing at 17 to 40° C. for 0.2 to 48 hours, or sealing and stirring the mixture at 17 to 40° C. for 0.1 to 24 hours.

(Acetylation Step (ii))

In acetylation step (ii) of acetylating the pretreated and activated cellulose in the presence of a sulfuric acid catalyst, acetylation can be started by, for example, adding pretreated and activated cellulose to a mixture containing acetic acid, acetic anhydride and sulfuric acid, or adding a mixture of acetic acid and acetic anhydride and sulfuric acid to pretreated and activated cellulose.

In addition, the ratio of acetic acid and acetic anhydride is not particularly limited as long as the mixture contains acetic acid and acetic anhydride, the amount of acetic anhydride is preferably 200 to 400 parts by weight based on 300 to 600 parts by weight of acetic acid, more preferably 240 to 280 parts by weight based on 350 to 530 parts by weight of acetic acid.

As a ratio of cellulose, a mixture of acetic acid and acetic anhydride, and sulfuric acid in the acetylation reaction, the amount of the mixture of acetic acid and acetic anhydride is preferably 500 to 1,000 parts by weight, the amount of the concentrated sulfuric acid is preferably 5 to 15 parts by weight, more preferably 7 to 13 parts by weight, still more preferably 8 to 11 parts by weight based on 100 parts by weight of cellulose.

In acetylation step (ii), the acetylation reaction of cellulose can be carried out by performing stirring at 20 to 55° C. for 30 minutes to 36 hours from the start of acetylation.

In addition, the acetylation reaction of cellulose can be carried out under, for example, stirring conditions with the temperature elevated to 20 to 55° C. over 5 minutes to 36 hours from the start of acetylation, or the acetylation reaction can be carried out under stirring conditions without applying heat to the inside and outside of the reaction system from outside. In the early stage of the acetylation reaction, a reaction in a solid-liquid heterogeneous system proceeds, and it is preferable to spend as much time as possible on elevating the temperature for reducing the amount of unreacted substances by causing the acetylation reaction to proceed while suppressing a depolymerization reaction, but from the viewpoint of productivity, it is preferable to elevate the temperature over 2 hours or less, more preferably 1 hour or less.

The time taken for the acetylation reaction (hereinafter, also referred to as an acetylation time) is preferably 30 to 200 minutes. Here, the acetylation time is a time until a neutralizing agent is added after a time point at which cellulose raw material is added in the reaction system to start reacting with acetic anhydride.

(Saponification and Aging Step (iii))

In saponification and aging step (iii) of partially neutralizing the sulfuric acid catalyst, and performing aging in the presence of the sulfuric acid catalyst (or remaining sulfuric acid), sulfuric acid is bonded to cellulose as a sulfuric acid ester by the acetylation reaction, and therefore the sulfuric acid ester is saponified and removed for improving thermal stability after completion of the acetylation reaction. In saponification and aging, a neutralizing agent such as water, dilute acetic acid or a magnesium acetate aqueous solution is added for stopping the acetylation reaction. When water is added, the water reacts with acetic anhydride present in a reaction mixture containing cellulose acetate, so that acetic acid is generated, and the neutralizing agent can be added in such a manner that the reaction mixture containing cellulose acetate after the saponification and aging step has a moisture content of 5 to 70 mol % based on the amount of acetic acid. When the moisture content is less than 5 mol %, the saponification reaction does not proceed, and depolymerization proceeds, resulting in production of a low-viscosity cellulose acetate, and when the moisture content is more than 70 mol %, the cellulose ester (cellulose triacetate) after completion of the acetylation reaction is precipitated, and leaves the saponification and aging reaction system, so that the saponification reaction of the precipitated cellulose ester no longer proceeds.

Here, dilute acetic acid is a 1 to 50 wt % acetic acid aqueous solution. In addition, the magnesium acetate concentration of the magnesium acetate aqueous solution is preferably 5 to 30% by weight.

The reaction mixture containing cellulose acetate is any mixture containing cellulose acetate in each step until cellulose acetate is obtained.

In addition, when the sulfate ion concentration in the reaction mixture containing cellulose acetate is high, the sulfuric acid ester cannot be efficiently removed, and therefore it is preferable to reduce the sulfate ion concentration by adding an aqueous solution of an alkaline earth metal salt of acetic acid such as magnesium acetate or an acetic acid-water mixed solution to form an insoluble sulfuric acid salt. Preferably, the amount of sulfate ions in the reaction mixture containing cellulose acetate is adjusted to 1 to 6 parts by weight based on 100 parts by weight of cellulose acetate (cellulose equivalent). For example, by adding an acetic acid-water mixed solution of magnesium acetate to the reaction mixture containing cellulose acetate, the acetylation reaction can be stopped concurrently with reducing the weight ratio of sulfate ions to 100 parts by weight of cellulose acetate (cellulose equivalent).

The time of saponification and aging (hereinafter, also referred to as an "aging time") is not particularly limited, but it is preferably 100 to 300 minutes when the acetylation degree is adjusted to 52% or more and 59% or less, and for obtaining a desired acetylation degree, the time may be appropriately adjusted. Here, the aging time is a time until the saponification reaction is stopped after the start of adding a neutralizing agent.

In addition, saponification and aging is performed by holding the product for 20 to 120 minutes at an aging temperature of preferably 50 to 100° C., especially preferably 70 to 90° C. Here, the aging temperature is a temperature in the reaction system in the aging time.

In the saponification and aging step, the entire reaction system can be kept at a uniform and appropriate temperature by utilizing reaction heat of water and acetic anhydride, so that generation of a product having an excessively high or low acetylation degree is prevented.

(Purification and Drying Treatment (iv))

In purification and drying treatment (iv), purification can be performed by mixing a mixture containing cellulose acetate and a precipitating agent such as water, dilute acetic acid or a magnesium acetate aqueous solution, separating the generated cellulose acetate (precipitate) to obtain the precipitate, and removing free metal components, sulfuric acid components and the like by washing with water. Here, water or dilute acetic acid is preferable as a precipitating agent to be used for obtaining a precipitate of cellulose acetate. This is because a sulfuric acid salt in the reaction mixture containing cellulose acetate is dissolved, and the sulfuric acid salt in cellulose acetate, which is obtained as a precipitate, is easily removed.

In particular, in addition to washing with water, an alkali metal compound and/or an alkaline earth metal compound, particularly a calcium compounds such as calcium hydroxide, may be added as a stabilizer if necessary for improving thermal stability of cellulose acetate after the aging reaction (after complete neutralization). In addition, a stabilizer may be used in washing with water.

Examples of the specific method for mixing a precipitating agent with a reaction mixture containing cellulose acetate include a method in which a reaction mixture containing cellulose acetate and a precipitating agent are stirred using a commercial mixer, and a method in which a precipitating agent is added to a reaction mixture containing cellulose acetate, and the mixture is kneaded using a twin-screw kneader. For example, in the case of a method for stirring using a commercial mixer, a reaction mixture containing cellulose acetate and a precipitating agent in an amount necessary for precipitating cellulose acetate are mixed at one time and stirred. In the case of a method including kneading the mixture using a twin-screw kneader, the precipitating agent can be added in several portions to the reaction mixture containing cellulose acetate, but it is preferable that the precipitating agent in an amount 0.5 to 2 times the amount of the reaction mixture containing cellulose acetate is added at one time immediately before a precipitation point is exceeded.

Preferably, separation of cellulose acetate (precipitate) is perfumed by filtration, centrifugation or the like after the precipitating agent is mixed.

The method for drying in purification and drying treatment (iv) is not particularly limited, and a known method can be used. For example, drying can be performed under conditions of air blowing, reduction of pressure and the like. As a drying method may be, for example, hot air king.

(Grinding Step (v))

The method for grinding a cellulose acetate precipitate in grinding step (v) is not limited. For grinding, a conventional grinder, such as a sample mill, a hammer mill, a turbo mill, an atomizer, a cutter mill, a bead mill, a ball mill, a roll mill, a jet mill, a pin mill or the like can be used. Alternatively, freeze grinding, dry grinding at normal temperature, or wet grinding may be performed. In particular, it is preferable to use a hammer mill or a turbo mill because it is excellent in grinding ability.

(Step of Reducing the Amount of Low-Molecular-Weight Components (vi))

For ensuring that in cellulose acetate, the content of low-molecular-weight components having a molecular weight of not more than ¼ of the peak top molecular weight in a molecular weight distribution measured by gel permeation chromatography of cellulose acetate is 12% or less, it is necessary to pass through step (vi) of reducing the amount of low-molecular-weight components contained in cellulose acetate.

The present inventors have found that a main coloring substance causing cellulose acetate to have a yellow color is an acetate compound which is a polysaccharide containing cellulose acetate having a low molecular weight. Step (vi) of reducing the amount of low-molecular-weight components contained in cellulose acetate is intended to reduce the amount of such an acetate compound which is a polysaccharide containing cellulose acetate having a low molecular weight. The molecular weight of such an acetate compound which is a polysaccharide containing cellulose acetate having a low molecular weight is, for example, about 10,000.

The method which can be employed in step (vi) of reducing the amount of low-molecular-weight components contained in cellulose acetate is not particularly limited as long as low-molecular-weight components can be separated from high-molecular-weight components, and examples thereof may include a method in which cellulose acetate is washed with a solvent capable of eluting low-molecular-weight components (hereinafter, sometimes referred to as "washing treatment"); a method in which liquid chromatography is carried out; and a method in which cellulose acetate is dissolved in a solvent capable of eluting low-molecular-weight components, and the low-molecular-weight components are removed using a reverse osmosis membrane. The cellulose acetate subjected to step (vi) of reducing the amount of low-molecular-weight components contained in cellulose acetate may be any of various forms, for example a powder form, a particulate form, fibrous form and flake form.

The method for washing cellulose after grinding step (v) with a solvent capable of eluting low-molecular-weight components will be described in detail. The solvent to be used in this method, i.e. the washing solvent, is preferably a solvent which swells or partially dissolves cellulose acetate rather than fully dissolving the cellulose acetate. The solvent which swells or partially dissolves cellulose acetate may be any solvent as long as low-molecular-weight components can be dissolved and eluted, and the ratio of low-molecular-weight components and high-molecular-weight components dissolved in the solvent is not particularly limited as long as high-molecular-weight components having a molecular weight exceeding ¼ of the peak top molecular weight can be fractionated. For efficiently obtaining high-molecular-weight components by removing low-molecular-weight components of cellulose acetate, it is preferable to use a solvent which dissolves 0.1 to 30% by weight, preferably 1 to 25% by weight, more preferably 1 to 15% by weight of cellulose acetate dispersed and dissolved in the solvent when the cellulose acetate is dispersed and dissolved in the solvent in such a manner that the solid concentration is 10% by weight at normal temperature (25° C.). When the amount of cellulose acetate dissolved is less than 0.1% by weight, low-molecular-weight components cannot be eluted even by repeated washing and when the amount of cellulose acetate dissolved is more than 30% by weight, economic efficiency is reduced, and it is difficult to industrially produce cellulose acetate with high efficiency, e.g. with an excellent yield.

In selection of such a washing solvent, it is possible to refer to a solubility parameter δ (e.g. H. Burrell; Off. Dig., 29, 1069 (1957)). Further, this solubility parameter δ can be determined from the following equation as described in, for example, J. H. Hildebrand, R L Scott; "Solubility of Non-electrolytes" Chap. 20, Rein hold (1950).

$$\delta=(E/V)^{0.5}$$

where E represents molar heat of vaporization (cal), and V represents a molecular volume (cc).

Examples of the selectable solvent may include: ketones such as acetone (10.0) (the value in parenthesis is a solubility parameter δ value, the same applies hereinafter), methyl ethyl ketone (9.3), diethyl ketone (8.8), methyl isobutyl ketone (8.4), diisopropyl ketone (8.0) and diisobutyl ketone (7.8); ethers such as dibutyl ether (7.1), dioxane (9.9) and tetrahydrofuran (10.2); organic acids such as formic acid (12.1), acetic acid (10.2), propionic acid (9.9) and butyric acid (10.5); esters such as methyl acetate (9.6), ethyl acetate (9.1), isopropyl acetate (8.4), butyl acetate (8.5), amyl acetate (8.5), cellosolve acetate (8.7), methyl propionate (8.9), ethyl propionate (8.4) and ethyl lactate (10.0); cellosolves such as methyl cellosolve (9.9), ethyl cellosolve (10.5), butyl cellosolve (8.9), methyl cellosolve acetate (9.2) and cellosolve acetate (10.0); carbitols such as ethyl carbitol (9.6), prowl carbitol and butyl carbitol (8.9); halogenated hydrocarbons such as chloroform (9.3), dichloromethane (10.2), dichloroethane (9.5) and carbon tetrachloride (8.6); nitro compounds such as nitroethane (11.1) and nitropropane (10.3); aprotic polar solvents such as acetonitrile (11.9), N,N-dimethylformamide (12.1), N,N-diethylformamide (10.6), dimethylacetamide (10.8) and diethylacetamide (9.9); and mixed solvents thereof.

For efficiently eluting low-molecular-weight components, the solubility parameter δ is preferably 9 to 10.5, more preferably 9 to 11, still more preferably 8.5 to 11.5, even more preferably 8 to 12, most preferably 7 to 12.5.

The selectable solvent and some other solvent can be mixed, and used as a mixed solvent. In this case, it is preferable to use a solvent having a solubility parameter δ of 7 to 12.5 as the selectable solvent, and it is preferable to mix and use a solvent having a solubility parameter δ of 14 or more as some other solvent. When water is used as the other solvent, it is preferable to use the solvent together with a hydrophilic solvent, particularly a water-soluble solvent such as acetone or acetic acid, as the selectable solvent.

It is preferable that a mixed solvent containing a poor solvent such as water and/or an alcohol, among other solvents, is used for the selectable solvent as a washing solvent because low-molecular-weight components can be selectively eluted by suppressing excessive dissolution of cellulose acetate. The ratio of the poor solvent may be selected within a range which ensures that low-molecular-weight components of cellulose acetate can be eluted, and the ratio of the poor solvent to the whole washing solvent is, for example, about 5 to 95% by weight, preferably about 30 to 70% by weight.

The amount of the solvent used is not particularly limited, and can be selected from a wide range. For example, the amount of the solvent used is preferably 10 parts by weight or more and 200 parts by weight or less, more preferably 50 parts by weight or more and 150 parts by weight or less based on 10 parts by weight of cellulose acetate.

Examples of the washing treatment method include a method in which cellulose acetate is immersed or dispersed in the washing solvent; a method in which cellulose acetate is wetted or impregnated with the washing solvent, the washing solvent is then added as necessary, and the solvent and cellulose acetate are separated from each other by filtration and centrifugation. In addition, if necessary, in order to enhance the elution efficiency of low-molecular-weight components, warming or heating may be performed, for example, in the range of 30° C. to the boiling point of the solvent (e.g., about 40 to 90° C.).

The cellulose acetate subjected to the solvent washing treatment is separated by filtration, centrifugation or the like and dried. The method of drying is not particularly limited, and a known method can be used. For example, drying can be performed under conditions of air blowing, reduction of pressure and the like. As a drying method may be, for example, hot air drying.

The method using liquid chromatography will now be described in detail. The method include a method using known liquid chromatography to be used as means for measuring the molecular weight distribution of a polymer, particularly a method using gel permeation chromatography (GPC). This method includes separating molecules according to a difference in molecular weight by taking advantage of a phenomenon in which when a dilute solution of a polymer passes through a column, molecules having a larger molecular weight are harder to catch in pores of a filling agent (gel), and therefore molecules having a larger molecular weight more smoothly and quickly pass through the column. By taking advantage of this property, molecules having a molecular weight in a desired range can be selectively collected.

In addition, the method include a method in which a dilute solution is prepared by dissolving a polymer in a solvent capable of eluting low-molecular-weight components, and the low-molecular-weight components are then removed using a reverse osmosis membrane.

As described above, the method which can be employed in step (vi) of reducing the amount of low-molecular-weight components contained in cellulose acetate is not particularly limited as long as low-molecular-weight components can be separated from high-molecular-weight components. Since polymer compounds have polydispersity, attempts to separate polymer compounds according to the molecular weight have been made over a period of time as long as the history of studies on polymer compounds, and collection methods based on the findings thereof can all be applied in the present invention

[Molded Article]

The molded article containing the cellulose acetate of the present disclosure is obtained by molding the cellulose acetate of the present disclosure. Examples of the molding method include injection molding, extrusion molding, vacuum molding, profile molding, foam molding, injection press, press molding, blow molding and gas injection molding.

The shape of the molded article is not particularly limited, and may be, for example, a pellet shape, a film shape, a sheet shape, a fiber shape or the like. These shapes are suitable fields of OA/home electric appliances, electric and electronic fields, fields of communication devices, fields of transportation vehicles such as automobiles, fields of housings and associated products such as furniture and building materials, fields of miscellaneous goods, and the like.

The molded article containing the cellulose acetate of the present disclosure may be produced by molding using cellulose acetate to which a plasticizer is adsorbed by mixing the cellulose acetate of the present disclosure with the plasticizer, and drying the mixture. Specifically, the method may be, for example, a method in which cellulose acetate to which a plasticizer is adsorbed is kneaded by an extruder such as a single-screw or twin-screw extruder to be molded into pellets; and a method in which cellulose acetate to which a plasticizer is adsorbed is melted and kneaded by a heating roll or a kneader such as a Banbury mixer to be molded. In addition, after the cellulose acetate is molded into pellets, the pellets may be remelted and molded into a film or the like using, for example, a single-screw or twin-screw extruder equipped with a T-die.

When a plasticizer is mixed with the cellulose acetate of the present disclosure, the cellulose acetate and the plasticizer can be mixed by a mixer such as a planetary mill, a Henschel mixer, a vibration mill or a ball mill. It is preferable to use a Henschel mixer because mixing and dispersion can be performed homogeneously in a short time. In addition, the degree of mixing is not particularly limited, but, for example, in the case of a Henschel mixer, it is preferable to perform mixing for 10 minutes to 1 hour.

In addition, drying can be performed after the cellulose acetate and the plasticizer are mixed. As a drying method may be, for example, a method in which the mixture is left standing and dried at 50 to 105° C. for 1 to 48 hours.

Examples of the plasticizer may include: aromatic carboxylic acid esters [phthalic acid di-C1-12 alkyl esters such as dimethyl phthalate, diethyl phthalate, dibutyl phthalate, dihexyl phthalate, dioctyl phthalate and di-2-ethylhexyl phthalate; phthalic acid C1-6 alkoxy C1-12 alkyl esters such as dimethoxyethyl phthalate; phthalic acid C1-12 alkyl/aryl-c1-3 alkyl esters such as butylbenzyl phthalate; C1-6 alkyl phthalyl C2-4 alkylene glycolates such as ethyl phthalyl ethylene glycolate and butyl phthalyl butylene glycolate; trimellitic acid tri-C1-12 alkyl esters such as trimethyl trimellitate, triethyl trimellitate, trioctyl trimellitate and tri-2-ethylhexyl trimellitate; pyromellitic acid tetra-C1-12 alkyl esters such as tetraoctyl pyromellitate; and the like]; phosphoric acid esters [tributyl phosphate, tricresyl phosphate, triphenyl phosphate and the like]; fatty acid esters [adipic acid esters such as dibutyl adipate, dioctyl adipate, butoxyethoxyethyl benzyl adipate and dibutoxyethoxyethyl adipate; azelaic acid esters such as diethyl azelate, dibutyl azelate and dioctyl azelate; sebacic acid esters such as dibutyl sebacate and dioctyl sebacate; butyl oleate; methylacetyl ricinoleate; and the like]; lower fatty acid esters of polyhydric alcohols (glycerin, trimethylolpropane, pentaerythritol, sorbitol and the like) [triacetin; diglycerin tetraacetate; and the like]; glycol esters (dipropylene glycol dibenzoate); citric acid esters [acetyltributyl citrate and the like]; amides [N-butyl benzene sulfonamide and the like]; and ester oligomers (caprolactone oligomers and the like). These plasticizers may be used singly or in combination of two or more thereof.

Among the above-mentioned plasticizers, it is preferable to use diethyl phthalate, triphenyl phosphate or triacetin, because it has high compatibility with cellulose acetate.

Even when about 40 parts by weight of these plasticizers are added based on 100 parts by weight of the cellulose acetate according to the present disclosure, deterioration of adaptability to a molded article production process hardly occurs. Deterioration of adaptability to a molded article production process is caused by, for example, occurrence of bridging in a hopper when cellulose acetate containing a plasticizer is fed to an extruder using a hopper in a process for producing a molded article of cellulose acetate. The amount of the plasticizer added is preferably 20 to 40 parts by weight, more preferably 24 to 36 parts by weight, still more preferably 26 to 34 parts by weight based on 100 parts by weight of the cellulose acetate according to the present disclosure. When the amount of the plasticizer added is less than 20 parts by weight, spot-like specks are easily generated in the molded article, and when the amount of the plasticizer added is more than 40 parts by weight, the bending strength of the molded body is reduced.

At the time of mixing cellulose acetate and a plasticizer, for example, other additives (antioxidants, ultraviolet absorbers, heat stabilizers, light stabilizers and the like); colorants (dyes, pigments and the like); antistatic agents, flame retardant auxiliaries; lubricants; anti-blocking agents, dispersants; fluidizing agents; anti-dripping agents; antibacterial agents; and the like may be added as common additives according to the use and specification of a molded article. In addition, other cellulose esters (for example, organic acid esters such as cellulose propionate and cellulose butyrate, or inorganic acid esters such as cellulose nitrate, cellulose sulfate and cellulose phosphate), other polymers and the like may be used in combination.

EXAMPLES

Hereinafter, the present invention will be described in detail by way of examples, but the technical scope of the present invention is not limited to these examples.

Physical properties as described in the examples below were evaluated by the following methods.

<Acetylation Degree>

The acetylation degree of cellulose acetate was determined by the method for measuring an acetylation degree in ASTM-D-817-91 (Method for Testing Cellulose Acetate and Others). 1.9 g of dried cellulose acetate was precisely weighed, and dissolved in 150 ml of a mixed solvent of acetone and dimethyl sulfoxide (volume ratio 4:1), 30 ml of a 1N sodium hydroxide aqueous solution was added, and the mixture was saponified at 25° C. for 2 hours. Phenolphthalein was added as an indicator, and excess sodium hydroxide was titrated with 1N sulfuric acid (concentration factor: F). In addition, a blank test was conducted in the same manner as described above, and the acetylation degree was calculated in accordance with the following equation.

$$\text{acetylation degree (\%)} = [6.5 \times (B-A) \times F]/W$$

where A represents a titer of 1N sulfuric acid in the sample (ml), B represents a titer of 1N sulfuric acid in the blank test (ml), F represents a concentration factor of 1N sulfuric acid, and W represents a weight of the sample.

<Viscosity at 6%>

The viscosity at 6% of cellulose acetate was measured by the following method. In an Erlenmeyer flask, 3.00 g of a dried sample and 39.90 g of a 95% acetone aqueous solution were added, the flask was tightly stoppered, and the mixture was stirred for about 1.5 hours. Thereafter, the flask was shaken for about 1 hour by a rotary shaker to completely dissolve the sample. The resulting 6 wt/vol % solution was transferred to a predetermined Ostwald viscometer up to a marked line, and thermally conditioned at 25±1° C. for about 15 minutes. The time during which the solution flew down between the clocking marked lines was measured, and the viscosity at 6% was calculated from the following equation (1).

$$\text{viscosity at 6\% (mPa·s)} = \text{flow-down time (s)} \times \text{viscometer coefficient} \tag{1}$$

Using a standard solution for viscometer calibration (manufactured by Showa Oil Co., Ltd., trade name "JS-200" (conforming to JIS Z 8809)), the flow-downtime was measured by the same operation as described above, and the viscometer coefficient was determined from the following equation (2).

viscometer coefficient={standard solution absolute viscosity (mPa·s)×solution density (0.827 g/cm$^3$)}/{standard solution density (g/cm$^3$)× standard solution flow-time (seconds) (s)}  (2)

<Weight Average Molecular Weight (Mw), Number Average Molecular Weight (Mn) and Content of Low-Molecular-Weight Components Having a Molecular Weight of not More Than ¼ of the Peak Top Molecular Weight>

The weight average molecular weight (Mw), number average molecular weight (Mn) and content of low-molecular-weight components having a molecular weight of not more than ¼ of the peak top molecular weight for cellulose acetate were determined by gel permeation chromatography (GPC) under the following conditions.

GPC Measurement Conditions
Guard column: PolyPore GUARD Size 50×7.5 mm (Agilent Technology Inc.)
Column: PolyPore Size 300×7.5 mm×2 (Agilent Technology Inc.)
Eluent: NMP+0.1 M LiBr
Sample concentration: 0.50% w/v
Sample injection amount 50 μL
Column temperature: 55° C.
Flow rate: 0.5 mL/min
Detector: RI (differential refractometer)
Apparatus: HPLC Prominence+analysis program Lab Solutions Ver. 5.73 (manufactured by Shimadzu Corporation)
Standard sample: Polymethyl methacrylate (M-M-10 set) (Agilent Technology Inc.)

<Sugar Composition Analysis>

Cellulose acetate was hydrolyzed with sulfuric acid, neutralized with barium carbonate, and filtered through a filter paper and an ion exchange filter, the molar contents of glucose, xylose and glucose were calculated using data obtained by HPLC-CAD (Agilent 1200 Series System) among high performance liquid chromatography (HPLC) methods, and the ratio of the molar content of glucose to the sum of the molar contents of glucose, xylose and mannose was determined.

The HPL-CADC measurement conditions are as follows.
Column: Asahipak NH2P-50 4E (4.6 mm I.D.×250 mm)
Guard column: Asahipak NH2P-50G 4A (4.6 mm I.D.×10 mm)
Column temperature: 20° C.
Mobile phase: water/acetonitrile=25/75 (v/v)
Mobile phase flow rate: 1.0 mL/min
Detector: CoronaPlus CAD Detector (manufactured by ESA Biosciences)
Nitrogen gas pressure: 35 psi
Nebulizer: 30° C.

<YI Value (Yellow Index Value)>

The YI value of cellulose acetate was determined by measuring the YI value in light transmitted through the cellulose acetate solution "Spectro Color Meter SQ2000" (trade name) manufactured by Nippon Denshoku Industries Co., Ltd. was used as a measurement apparatus, and a measurement diameter of 30 mm, a C light source, a 2° visual field and EXCLUDE (no regular reflection) were selected as measurement conditions. To 12 g of dried cellulose acetate were added 8.8 g of methanol and 79.2 g of methylene chloride, the cellulose acetate was dissolved, the solution was degassed, and added in a glass cell of 45 mm (L)×45 mm (W)×10 mm (D), and the YI value was measured. As the YI value decreases, the cellulose acetate becomes less yellowish, and more excellent in hue.

<Absorptiometric Hue>

A DMSO solution having cellulose acetate at a known concentration is prepared as a sample, the absorbance at a wavelength λ of 430 nm and the absorbance at a wavelength of 740 nm are measured, a difference between these absorbances is determined, and converted to a value corresponding to a cellulose acetate concentration of 100%, and the thus-obtained value is defined as an absorptiometric hue. The absorptiometric hue of cellulose acetate was measured by the following method.

(1) Measurement of Moisture Content of Cellulose Acetate

The moisture content of cellulose acetate was measured using an infrared moisture meter (METTLER TOLEDO HB43), and recorded on a recording sheet.

(2) Measurement of Absorbance

First, sample preparation was performed. 1) 95.00 g of DMSO was weighed in an Erlenmeyer flask. 2) A stirrer rotor was put in the Erlenmeyer flask, the flask was stoppered with cellophane and silicon, and the DMSO was stirred. 3) A 5.00 g of a cellulose acetate sample was weighed on a drug packing sheet or the like, and added in the Erlenmeyer flask undergoing stirring. 4) The flask was stoppered with cellophane and silicone, and the mixture was stirred for 1 hr with the stirrer. 5) The flask was shaken for 2 hr by a rotary shaker (high speed). 6) The flask was taken out from the rotary shaker, and then left standing for 30 minutes to perform degassing, thereby preparing a sample.

Next, the absorbance was measured. Immediately after preparation of the sample, that is, immediately after the flask was left standing for 30 minutes to perform degassing immediately after the flask was taken out from the rotary shaker, absorbances at wavelengths λ of 430 nm and 740 nm were measured using UV-1700 manufactured by Shimadzu Corporation. Specifically, 1) the apparatus was turned on 30 minutes or more before measurement, and it was confirmed that the apparatus was stabilized. 2) DMSO was added as a reference or blank solution in a 10 cm glass cell, and baseline correction was performed 3) The sample in the Erlenmeyer flask was transferred to a 10 cm glass cell in such a manner that bubbles were not generated 4) The measuring cell on the front side was replaced by the glass cell containing the sample. 5) The measurement was started by pressing a start button 6) The displayed measurement results were recorded on a recording sheet.

(3) Absorptiometric Hue

The numerical value obtained from the following calculation formula was taken as an "absorptiometric hue" value in the solvent of cellulose acetate.

absorptiometric hue (cm$^{-1}$)=absorbance $(A-B)$/cell thickness (cm)/cellulose acetate concentration (% by weight)×100

Absorbance: spectrophotometer UV-1700 manufactured by Shimadzu Corporation
A: Absorbance at 430 nm (measurement of yellowness of solution)
B: Absorbance at 740 nm (measurement of turbidity of solution: baseline)
Cellulose acetate concentration (% by weight): absolute dry cellulose acetate weight (g)/total weight of cellulose acetate solution (g)×100

Absolute dry cellulose acetate weight (g): weight of cellulose acetate (g)×(1−moisture content (%)/100)

Moisture content (%): value measured with the above-mentioned infrared moisture meter The value of the absorptiometric hue at a wavelength of 430 nm decreases, the cellulose acetate becomes less yellowish, and more excellent in hue.

<YI Value of Cellulose Acetate Molded Article>

The hue of the cellulose acetate molded article was evaluated by measuring the YI value (yellow index value) in the reflected light of pellets in accordance with ASTM E313-73. Spectrocolorimeter CM-5 manufactured by Konica Minolta Inc. was used as a measurement apparatus, and a measurement diameter of 30 mm, a D65 light source, a 10° visual field and SCE were selected as measurement conditions. Calibration glass CM-A212 for petri dish measurement was inserted into a measurement section, and covered with a zero calibration box CM-A124 to perform zero calibration, followed by performing white calibration using a built-in white calibration plate. Measurement was performed using a white calibration plate CM-A210, and it was confirmed that L* was 99.16±0.05, a* was −0.07±0.02, b* was 0.02±0.01, and YI was −0.02±0.01. Measurement of pellets was performed with the pellets packed to a depth of about 40 mm in a cylindrical glass container having an inner diameter of 30 mm and a height of 50 mm. The operation of taking out the pellets from the glass container and performing measurement was repeated twice, and an average of the total three measurements was used. As the YI value decreases, the molded article becomes less yellowish, and more excellent in hue.

Comparative Example 1

Softwood sulfite pulp having an α-cellulose content of 97.8 wt % was crushed into a cotton form with a disc refiner to obtain crushed pulp. 26.8 parts by weight of acetic acid was sprayed to 100 parts by weight of crushed pulp (water content: 8%), and the mixture was thoroughly mixed, and left standing for 60 hours as pretreatment to activate the mixture (activation step).

The activated pulp was added to a mixture including 323 parts by weight acetic acid, 245 parts by weight acetic anhydride and 13.1 parts by weight sulfuric acid. The mixture was cooled to 5° C. in advance. The temperature was adjusted to a maximum temperature of 40° C. from 5° C. over 40 minutes, and acetylation was performed for 90 minutes from the time point at which the pulp was added to the mixture (acetylation step). A neutralizing agent (24% magnesium acetate aqueous solution) was added over 3 minutes so as to adjust the amount of sulfuric acid (the amount of aged sulfuric acid) to 2.5 parts by weight. Further, water was added, so that the reaction bath moisture (aging moisture) concentration was 52 mol %, and the temperature of the reaction bath was elevated to 75° C. over 65 minutes. The ratio of reaction bath moisture to acetic acid was determined in tams of a molar ratio, and the molar ratio was multiplicated by 100 to determine the aging moisture concentration expressed as mol %. Thereafter, aging was performed at 85° C. for 100 minutes, and aging was stopped by neutralizing sulfuric acid with magnesium acetate to obtain a reaction mixture containing cellulose acetate (aging step).

Dilute acetic acid (10 wt %) was kneaded into the obtained reaction mixture containing cellulose acetate using a twin-screw kneader, and the cellulose acetate was precipitated by a kneading precipitation method. At this time, dilute acetic acid was kneaded into the reaction mixture containing cellulose acetate in three portions. Dilute acetic acid (10 wt %) was kneaded at a ratio (weight ratio) of 0.4 times the amount of the reaction mixture containing cellulose acetate in the first, and after the reaction mixture became uniform, the dilute acetic acid was kneaded at a ratio (weight ratio) of 0.5 times the amount of the reaction mixture in the second, and at a ratio (weight ratio) of 0.6 times the amount of the reaction mixture in the third. Thus, the dilute acetic acid was added at a ratio (weight ratio) of 1.5 times the amount of the reaction mixture in total. Precipitation occurred when the dilute acetic acid (10 wt %) was added at a ratio (weight ratio) of 0.6 times the amount of the reaction mixture in the third.

The precipitated cellulose acetate was washed with water, immersed in a dilute calcium hydroxide aqueous solution (20 ppm), then filtered K dried, and ground using a Makino grinder (Model: DD-2-3.7 manufactured by Makino Mfg Co., Ltd.). The grinding conditions were set to a rotational speed of 2450 rpm and a screen diameter of φ5.0 mm.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were each measured. The results are shown in Table 1.

Comparative Example 2

Except that the reaction bath moisture (aging moisture) concentration was 50 mol %, and aging was performed at 85° C. for 110 minutes, the same procedure as in Comparative Example 1 was carried out to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were each measured. The results are shown in Table 1.

Comparative Example 3

Except that softwood sulfite pulp having an α-cellulose content of 98.0 wt % was used, the same procedure as in Comparative Example 1 was carried out to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were measured. The results are shown in Table 1.

Comparative Example 4

Except that aging was performed at 85° C. for 110 minutes, the same procedure as in Comparative Example 1 was carried out to obtain cellulose acetate.

For the obtained cellulose acetate, the acetylation degree, the viscosity at 6%, the number average molecular weight (Mn), the weight average molecular weight (Mw), the content of low-molecular-weight components having a

Example 1

90 parts by weight of a 35 wt % acetic acid aqueous solution was added to 10 parts by weight of the cellulose acetate obtained in Comparative Example 4, the mixture was then stirred at 45° C. for 1 hour to obtain a cellulose acetate solution. The cellulose acetate solution was filtered with a cloth bag (Polyester 200T manufactured by SANEI KAKO Co., Ltd.), and the filtrate was then washed with 150 parts by weight of distilled water, and centrifugally dehydrated (rotation speed: 1000 rpm, 3 minutes). Thereafter, the filtrate was dried at 80° C. for 12 hours to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were measured. The results are shown in Table 1.

Example 2

90 parts by weight of a 50 wt % acetic acid aqueous solution was added to 10 parts by weight of the cellulose acetate obtained in Comparative Example 4, the mixture was then stirred at 45° C. for 1 hour to obtain a cellulose acetate solution. The cellulose acetate solution was filtered with a cloth bag (Polyester 200T manufactured by SANEI KAKO Co., Ltd.), and the filtrate was then washed with 150 parts by weight of distilled water, and centrifugally dehydrated (rotation speed: 1000 rpm, 3 minutes). Thereafter, the filtrate was dried at 100° C. for 12 hours to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were measured. The results are shown in Table 1.

Example 3

90 parts by weight of a 50 wt % acetone acetic acid aqueous solution was added to 10 parts by weight of the cellulose acetate obtained in Comparative Example 4, the mixture was then stirred at 45° C. for 1 hour to obtain a cellulose acetate solution. The cellulose acetate solution was filtered with a cloth bag (Polyester 200T manufactured by SANEI KAKO Co., Ltd.), and the filtrate was then washed with 150 parts by weight of distilled water, and centrifugally dehydrated (rotation speed: 1000 rpm, 3 minutes). Thereafter, the filtrate was dried at 80° C. for 12 hours to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were measured. The results are shown in Table 1.

Example 4

Cotton linter pulp having an α-cellulose content of 98.4 wt % was crushed into a cotton form with a disc refiner 15.4 parts by weight of acetic acid was sprayed to 100 parts by weight of crushed pulp (water content 8%), the mixture was thoroughly mixed, and left standing for 60 hours as pretreatment, 38.1 parts by weight of acetic acid and 1.2 parts by weight of sulfuric acid were then sprayed, and the mixture was thoroughly mixed, and then left standing for 1 hour to activate the mixture (activation step).

The activated pulp was added to a mixture including 334 parts by weight acetic acid, 241 parts by weight acetic anhydride and 11.9 parts by weight sulfuric acid. The mixture was cooled to 5° C. in advance. The temperature was adjusted to a maximum temperature of 43° C. from 5° C. over 45 minutes, and acetylation was performed for 110 minutes from the time point at which the pulp was added to the mixture (acetylation step). A neutralizing agent (24% magnesium acetate aqueous solution) was added over 3 minutes so as to adjust the amount of sulfuric acid (the amount of aged sulfuric acid) to 2.0 parts by weight. Further, water was added, so that the reaction bath moisture (aging moisture) concentration was 52 mol %, and the temperature of the reaction bath was elevated to 75° C. over 65 minutes. The ratio of reaction bath moisture to acetic acid was determined in tams of a molar ratio, and the molar ratio was multiplicated by 100 to determine the aging moisture concentration expressed as mol %. Thereafter, aging was performed at 85° C. for 100 minutes, and aging was stopped by neutralizing sulfuric acid with magnesium acetate to obtain a reaction mixture containing cellulose acetate (aging step).

Dilute acetic acid (10 wt %) was kneaded into the obtained reaction mixture containing cellulose acetate using a twin-screw kneader, and the cellulose acetate was precipitated by a kneading precipitation method. At this time, dilute acetic acid was kneaded into the reaction mixture containing cellulose acetate in three portions. Dilute acetic acid (10 wt %) was kneaded at a ratio (weight ratio) of 0.4 times the amount of the reaction mixture containing cellulose acetate in the first, and after the reaction mixture became uniform, the dilute acetic acid was kneaded at a ratio (weight ratio) of 0.5 times the amount of the reaction mixture in the second, and at a ratio (weight ratio) of 0.6 times the amount of the reaction mixture in the third. Thus, the dilute acetic acid was added at a ratio (weight ratio) of 1.5 times the amount of the reaction mixture in total. Precipitation occurred when the dilute acetic acid (10 wt %) was added at a ratio (weight ratio) of 0.6 times the amount of the reaction mixture in the third.

The precipitated cellulose acetate was washed with water, immersed in a dilute calcium hydroxide aqueous solution (20 ppm), then filtered off, dried, and ground using a Makino grinder (Model: DD-2-3.7 manufactured by Makino Mfg Co., Ltd.). The grinding conditions were set to a rotational speed of 2450 rpm and a screen diameter of φ5.0 mm.

90 parts by weight of a 50 wt % acetic acid aqueous solution was added to 10 parts by weight of the obtained cellulose acetate, the mixture was then stirred at 45° C. for 1 hour to obtain a cellulose acetate solution. The cellulose acetate solution was filtered with a cloth bag (Polyester 200T manufactured by SANEI KAKO Co., Ltd.), and the filtrate was then washed with 150 parts by weight of distilled water, and centrifugally dehydrated (rotation speed: 1000 rpm, 3 minutes). Thereafter, the filtrate was dried at 80° C. for 12 hours to obtain cellulose acetate.

For the obtained cellulose acetate, the acetylation degree, the viscosity at 6%, the number average molecular weight (Mn), the weight average molecular weight (Mw), the content of low-molecular-weight components having a molecular weight of not more than ¼ of the peak top molecular weight, the constituent sugar ratio, the YI value and the absorptiometric hue were measured. The results are shown in Table 1.

extruded to be pelletized. The YI value was measured for the obtained pellets. The results are shown in Table 2.

Example 6

100 parts by weight of the cellulose acetate obtained in Example 3 and 35 parts by weight of DEP (diethyl phthalate) were mixed by a Henschel mixer, dried at 80° C. for 12 hours, then supplied to a twin-screw extruder (cylinder temperature: 200° C., die temperature: 220° C.), and

TABLE 1

|  | Acetylation (%) | Viscosity at 6% | Number average molecular weight | Weight average molecular weight | Mw/Mn | Content of low-molecular-weight components having a molecular weight of not more than ¼ of the peak top molecular weight (%) | Constituent sugar ratio [mol %] | | | YI value | Absorptiometric hue |
|---|---|---|---|---|---|---|---|---|---|---|---|
|  | degree | (mPa · s) | (Mn) | (Mw) |  |  | Glucose | Xylose | Mannose |  | (cm⁻¹) |
| Comparative Example 1 | 55.4 | 119 | 71172 | 235421 | 3.31 | 13.6 | 98.5 | 0.7 | 0.8 | 3.1 | 0.148 |
| Comparative Example 2 | 55.4 | 113 | 77643 | 226566 | 2.92 | 12.8 | 98.5 | 0.7 | 0.8 | 4.1 | 0.144 |
| Comparative Example 3 | 55.3 | 117 | 90343 | 233589 | 2.59 | 12.1 | 98.5 | 0.7 | 0.8 | 3.6 | 0.148 |
| Comparative Example 4 | 55.2 | 114 | 78337 | 217196 | 2.77 | 12.1 | 98.5 | 0.7 | 0.8 | 3.3 | 0.137 |
| Example 1 | 55.2 | 105 | 78521 | 206761 | 2.63 | 10.9 | 98.5 | 0.7 | 0.8 | 1.9 | 0.099 |
| Example 2 | 55.2 | 67 | 74475 | 186296 | 2.50 | 9.7 | 98.5 | 0.7 | 0.8 | 2.2 | 0.095 |
| Example 3 | 55.2 | 105 | 78855 | 234425 | 2.97 | 9.2 | 98.5 | 0.7 | 0.8 | 2.0 | 0.098 |
| Example 4 | 55.2 | 118 | 105669 | 226901 | 2.15 | 8.2 | 99.8 | 0.2 | 0.0 | 1.3 | 0.052 |

Figure 2:
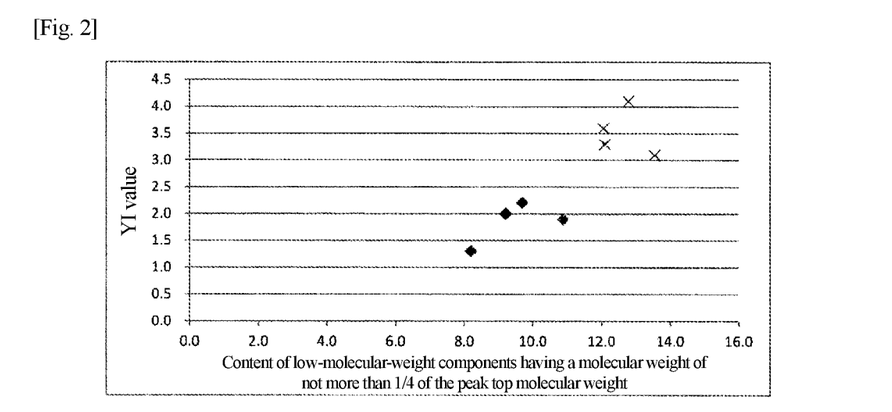
FIG. 2 is a graph showing a relationship between the content of low-molecular-weight components having a molecular weight of not more than ¼ of the peak top molecular weight of cellulose acetate and the YI value.
Figure 3:
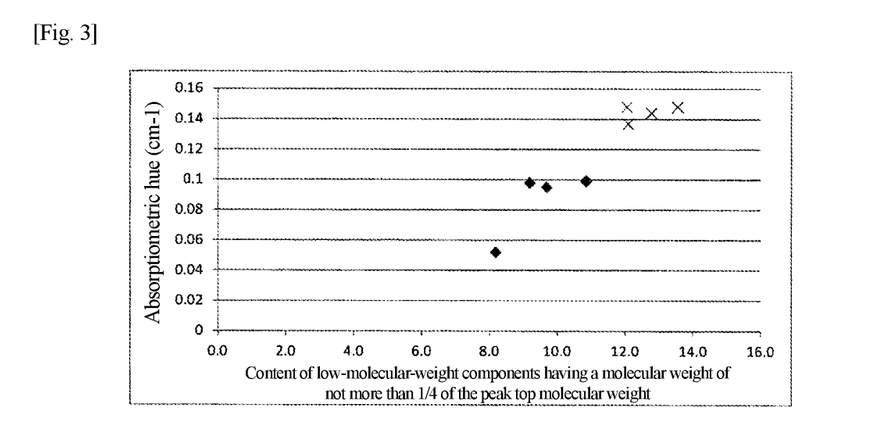
FIG. 3 is a graph showing a relationship between the content of low-molecular-weight components having a molecular weight of not more than ¼ of the peak top molecular weight of cellulose acetate and the absorptiometric hue.

In addition, for Examples 1 to 4 and Comparative Examples 1 to 4, a relationship between the YI value and the content of low-molecular-weight components having a molecular weight of not more than ¼ of the peak top molecular weight is shown in FIG. 2, and a relationship between the absorptiometric hue and the content of low-molecular-weight components having a molecular weight of not more than ¼ of the peak top molecular weight is shown in FIG. 3.

Comparison of Examples 1 to 4 with Comparative Examples 1 to 4 showed that cellulose acetate in which the content of low-molecular-weight components having a molecular weight of not more than ¼ of the peak top molecular weight in gel permeation chromatography was 12% or less had a low YI value and absorptiometric hue, and was excellent in transparency.

Comparative Example 5

100 parts by weight of the cellulose acetate obtained in Comparative Example 4 and 35 parts by weight of DEP (diethyl phthalate) were mixed by a Henschel mixer, dried at 80° C. for 12 hours, then supplied to a twin-screw extruder (cylinder temperature: 200° C., die temperature: 220° C.), and extruded to be pelletized. The YI value was measured for the obtained pellets. The results are shown in Table 2.

Example 5

100 parts by weight of the cellulose acetate obtained in Example 1 and 35 parts by weight of DEP (diethyl phthalate) were mixed by a Henschel mixer, dried at 80° C. for 12 hours, then supplied to a twin-screw extruder (cylinder temperature: 200° C., die temperature: 220° C.), and extruded to be pelletized. The YI value was measured for the obtained pellets. The results are shown in Table 2.

Example 7

100 parts by weight of the cellulose acetate obtained in Example 4 and 35 parts by weight of DEP (diethyl phthalate) were mixed by a Henschel mixer, dried at 80° C. for 12 hours, then supplied to a twin-screw extruder (cylinder temperature: 200° C., die temperature: 220° C.), and extruded to be pelletized. The YI value was measured for the obtained pellets. The results are shown in Table 2.

TABLE 2

| | Cellulose acetate | Content of low-molecular-weight components having a molecular weight of not more than 1/4 of the peak top molecular weight (%) | Molded article of cellulose acetate YI value |
|---|---|---|---|
| Comparative Example 5 | Comparative Example 4 | 12.1 | 37.5 |
| Example 5 | Example 1 | 10.9 | 30.4 |
| Example 6 | Example 3 | 9.2 | 17.9 |
| Example 7 | Example 4 | 8.2 | 12.6 |

Figure 4:
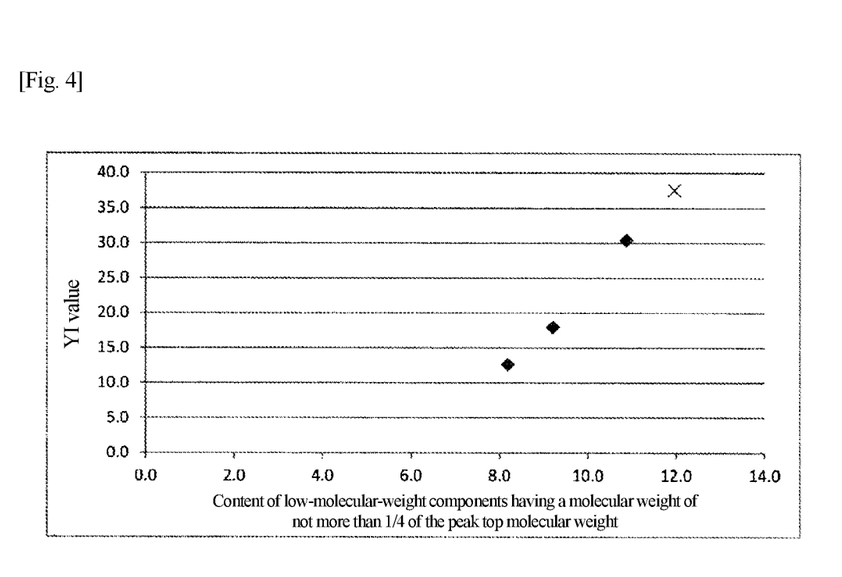
FIG. 4 is a graph showing a relationship between the content of low-molecular-weight components having a molecular weight of not more than ¼ of the peak top molecular weight of cellulose acetate in the form of a molded product and the YI value.

In addition, for Examples 5 to 7 and Comparative Example 5, a relationship between the YI value and the content of low-molecular-weight components having a molecular weight of not more than ¼ of the peak top molecular weight is shown in FIG. 4.

Comparison of Examples 5 to 7 with Comparative Example 5 showed that pellets formed from cellulose acetate in which the content of low-molecular-weight components having a molecular weight of not more than ¼ of the peak top molecular weight in gel permeation chromatography was 12% or less had a low YI value, and was excellent in transparency.

The invention claimed is:

1. Cellulose acetate having an acetylation degree ranging from 52% to 59%, and containing 12% or less of low-molecular-weight components, wherein
   the low-molecular-weight components are components having a molecular weight of not more than ¼ of a peak top molecular weight in a molecular weight distribution measured by gel permeation chromatography of cellulose acetate,
   Mw/Mn is from 2.15 to 2.97, where Mw is a weight average molecular weight of the cellulose acetate and Mn is a number average molecular weight of the cellulose acetate, and
   the weight average molecular weight of the cellulose acetate is from 50,000 to 500,000.

2. The cellulose acetate according to claim 1, wherein the cellulose acetate has a viscosity at 6% ranging from 30 mPa·s to 200 mPa·s.

3. The cellulose acetate according to claim 1 or 2, wherein a ratio of a molar content of glucose to a sum of molar contents of glucose, xylose and mannose is 97% or more in sugar composition analysis.

4. The cellulose acetate according to claim 3, wherein the ratio of the molar content of glucose to the sum of molar contents of glucose, xylose and mannose is 97.5% or more in the sugar composition analysis.

5. A molded article comprising the cellulose acetate according to claim 1 or 2.

* * * * *